United States Patent [19]

Wenzel et al.

[11] 4,229,311
[45] Oct. 21, 1980

[54] LUBRICATING OIL ADDITIVES

[75] Inventors: Franz Wenzel, Darmstadt; Ulrich Schoedel, Rossdorf; Heinz Jost, Messel; Hans Pilz, Darmstadt, all of Fed. Rep. of Germany

[73] Assignee: Röhm GmbH, Darmstadt, Fed. Rep. of Germany

[21] Appl. No.: 58,620

[22] Filed: Jul. 18, 1979

[51] Int. Cl.³ .................... C10M 1/32; C08K 5/01
[52] U.S. Cl. ............................ 252/50; 252/56 R; 260/30.2; 260/32.4; 260/33.6 UA; 526/258
[58] Field of Search ............ 260/30.2, 32.4, 33.6 UA; 526/258; 252/50, 56 R

[56] References Cited

U.S. PATENT DOCUMENTS

| | | | |
|---|---|---|---|
| 2,540,984 | 2/1951 | Jackson | 525/336 |
| 4,146,489 | 3/1979 | Stambaugh et al. | 252/50 |
| 4,149,984 | 4/1979 | Wenzel et al. | 252/51.5 A |
| 4,161,452 | 7/1979 | Stambagh et al. | 252/50 |

FOREIGN PATENT DOCUMENTS 952853  8/1974  Canada.
1068283  5/1967  United Kingdom.

Primary Examiner—A. Lionel Clingman
Attorney, Agent, or Firm—Curtis, Morris & Safford

[57] ABSTRACT

What is disclosed are methods for making polymer-in-oil solutions, useful for improving the viscosity-temperature relationship and low-temperature properties of lubricating oils when added thereto, which methods comprise polymerizing a methacrylic acid ester of an alcohol having 8 to 18 carbon atoms onto a polyolefin polymer of an olefinic hydrocarbon monomer having 2 to 4 carbon atoms in an oil solution of the polyolefin and ester monomers, then adding further polyolefin polymer to the solution and finally graft copolymerizing a polymerizable heterocyclic compound having a basic nitrogen atom in the ring thereof onto the resulting mixed polymers as backbone polymers or, in the alternative, separately graft copolymerizing a polymerizable heterocyclic compound having a basic nitrogen atom in the ring thereof onto a first backbone polymer which is itself a graft copolymer, in an oil solution, of a methacrylic acid ester of an alcohol having 8 to 18 carbon atoms on a polyolefin polymer of an olefinic hydrocarbon monomer having two to four carbon atoms and further graft copolymerizing a polymerizable heterocyclic compound having a basic nitrogen atom in the ring thereof onto a polyolefin polymer of the type described above and then combining the two graft copolymers thus formed to produce the desired polymer-in-oil solution.

17 Claims, No Drawings

LUBRICATING OIL ADDITIVES

The present invention relates to an improved method for making additives which improve the viscosity-temperature relationship, the pour point, and the dispersing behavior of lubricating oils and to the additives so produced.

U.S. Pat. No. 4,149,984 granted Apr. 17, 1979 to the present applicants discloses a method for making a polymer-in-oil solution useful for improving the viscosity-temperature relationship and low-temperature properties of lubricating oils when added thereto. The method described and claimed in that patent involves a first step of polymerizing a methacrylic acid ester of an alcohol having eight to eighteen carbon atoms in a solution, in a lubricating oil, of a polyolefin polymer of an olefinic hydrocarbon monomer having two to four carbon atoms, the oil solution of said polyolefin having a viscosity of less than 15,000 centistokes at 100° C. Then, in a second step, further polyolefin polymer of the type described above is added until the total polymer content in the oil solution is from 20 percent to 55 percent by weight of the solution and the methacrylate ester comprises from 50 percent to 80 percent of said polymer content.

In a preferred embodiment disclosed in the aforementioned patent, from 1 to 30 percent by weight of the methacrylate ester is replaced by a polymerizable heterocyclic compound having a basic nitrogen atom in the ring thereon. As discussed in the patent, suitable polymerizable heterocyclic nitrogenous compounds are taught, for instance, in German Pat. No. 1,003,896, in German Offenlegungsschrift No. 1,058,739, and in German Offenlegungsschrift No. 1,235,491, all of which relate to the use of such compounds in an attempt to improve the properties of lubricating oil additives, particularly from the point of view of increasing their dispersing and detergent effect. Typical nitrogen-containing monomers of this type include vinyl pyridine, vinyl pyrrolidine, vinyl pyrrolidone, and vinyl imidazole.

According to the process particularly described in this patent for grafting the nitrogen-containing monomer onto a backbone polymer, as specifically shown in Example 2 thereof, a portion of methacrylic acid esters of an alcohol having 8 to 18 carbon atoms is first graft copolymerized onto a degraded polyolefin copolymer, the nitrogen-containing heterocyclic monomer is then graft-copolymerized onto the first-prepared graft copolymer as a backbone polymer, and finally further degraded polyolefin copolymer is added until the total polymer content in the oil solution in which the graft copolymerizations proceed is from 20 percent to 55 percent by weight of the solution and the methacrylate ester and heterocyclic compound, considered together, comprise from 50 percent to 80 percent of the polymer content of the solution.

In the alternative, the methacrylate and heterocyclic monomer can be combined prior to any graft copolymerization step and the mixture of monomers thus obtained can be graft copolymerized onto a degraded polyolefin copolymer concurrently.

It has now been found that a still further variation of the graft copolymerization method produces lubricating oil additives, and solutions thereof in mineral oil, which are clearly superior, as measured by the conventional motor tests, to products prepared according to the methods of U.S. Pat. No. 4,149,984, whether or not those products contain a nitrogen heterocycle or are free thereof. More in particular, the superiority of the compounds prepared according to the method of the present invention can be demonstrated using the internationally-introduced standard Petter AVB and Caterpillar 1-H2 tests. This improved result was in no way to be foreseen from the state of the art.

More in particular, the mineral oil solutions of the additives according to the present invention are prepared by polymerizing a methacrylic acid ester of an alcohol having 8 to 18 carbon atoms in a solution, in lubricating oil, of a polyolefin polymer of an olefinic hydrocarbon monomer having two to four carbon atoms, the oil solution of said polyolefin having a viscosity of less than 15,000 centistokes at 100° C. Then, further polyolefin polymer of the type described above is added. A polymerizable heterocyclic compound having a nitrogen atom in the ring thereof is then added to this oil solution of two different backbone polymers and the nitrogen monomer is graft copolymerized onto the backbone polymers in an amount such that the total polymer content in the oil solution is from 20 percent to 55 percent by weight of the solution, the combined amount of methacrylate ester and polymerizable heterocyclic compound comprise from 50 percent to 80 percent of the polymer content, and the amount of heterocyclic compounds present is from 1 to 30 percent by weight of the methacrylic ester portion present.

In an alternative embodiment, the graft copolymer can first be formed between the methacrylate esters and the polyolefin polymer and the heterocyclic monomer can then be separately graft copolymerized onto this backbone polymer and onto a portion of previously un-grafted polyolefin polymer. In this way, again, two graft copolymers are formed, the backbone polymer of one of which graft copolymers is itself a graft copolymer. The two separately-formed graft copolymers are then combined in amounts such that a polymer-in-oil solution is formed having a total polymer content from 20 percent to 55 percent by weight of the solution and wherein, again, the combined methacrylate ester and heterocyclic monomer comprise from 50 percent to 80 percent by weight of the polymer content and the amount of heterocyclic monomer is from 1 to 30 percent by weight of the methacrylate ester.

All other aspects of the present invention resemble those aspects already disclosed in U.S. Pat. No. 4,149,984.

A better understanding of the present invention and of its many advantages will be had by referring to the following specific example, given by way of illustration.

Example 1(a)

A mixture comprising 95 percent of long-chain methacrylic acid esters ($C_{10\text{-}18}$-alcohol) and 5 percent of methyl methacrylate is polymerized using free-radical polymerization catalysts at a temperature of 90° C. in a mineral oil solution containing 10 percent by weight of a degraded olefinic copolymer comprising 72 percent by weight of ethylene and 28 percent by weight of propylene.

The polyolefin copolymer is degraded to an average molecular weight of about 90,000. The viscosity of the oil solution thereof has a value of 820 centistokes at 98.89° C. The acrylate esters are copolymerized onto the olefinic backbone polymer in such an amount that the total polymer content of the oil solution after the conclusion of polymerization is 42 percent. The viscosity of this product is 98.89° C. is 420 centistokes.

(b) At a temperature of 120° C., such an amount of a degraded olefinic copolymer having an average molecular weight of 90,000 is dissolved in the oil solution that the total polymer content of the solution is raised to 47 percent. The olefin copolymer may be, for example, either a copolymer comprising 72 percent of ethylene and 28 percent of propylene or 54 percent of ethylene and 46 percent of propylene.

(c) Five percent of vinyl pyrrolidone, by weight of the polymer content of the solution, is now polymerized at 130° C. in the presence of free-radical polymerization catalysts in the so-prepared mixture of backbone polymers. The polymerization can proceed, for example according to German Pat. No. 1,520,696.

Instead of vinyl pyrrolidone, a mixture of vinyl pyrrolidone and vinyl imidazole can be employed, for example.

In an alternative embodiment, the graft copolymerization step of (a) can first be carried out, followed by the graft copolymerization, onto the backbone graft copolymer thus prepared, of a heterocyclic monomer such as vinyl pyrrolidone, proceeding as in step (c). Separately, a heterocyclic monomer such as vinyl pyrrolidone is graft copolymerized onto a polyolefin polymer of the kind described in (b) above, the polyolefin being dissolved in a mineral oil.

After these separate graft copolymerizations, the two graft copolymers, each having a heterocyclic monomer such as N-vinyl pyrrolidone grafted thereon, are combined in amounts corresponding to those described for steps (a)-(c).

In each case, in the mineral oil solution of polymer thus produced, the total polymer content is 52 percent, the total content of methacrylate ester and heterocyclic monomer is 71 percent by weight of the total polymer content, and the amount of heterocyclic monomer incorporated thereinto is about 16 percent by weight of the methacrylate ester present in the copolymer.

What is claimed is:

1. A method for making a polymer-in-oil solution, useful for improving the viscosity-temperature relationship and low-temperature properties of lubricating oils when added thereto, which method comprises polymerizing a methacrylic acid ester of an alcohol having 8 to 18 carbon atoms in a solution, in a lubricating oil, of a polyolefin polymer of an olefinic hydrocarbon monomer having two to four carbon atoms, the oil solution of said polyolefin having a viscosity of less than 15,000 centistokes at 100° C., adding further polyolefin polymer of the type defined herein to said solution, and then graft copolymerizing a polymerizable heterocyclic compound having a basic nitrogen atom in the ring thereof onto the resulting mixed polymers as backbone polymers.

2. A method as in claim 1 wherein said polyolefin polymer has an average molecular weight between 70,000 and 200,000.

3. A method as in claim 2 wherein said polyolefin polymer is prepared by the thermal or mechanical degradation of a polymer having a higher molecular weight.

4. A method as in claim 1 wherein said polymerizable heterocyclic compound is selected from the group consisting of vinyl pyridine, vinyl pyrrolidine, vinyl pyrrolidone, and vinyl imidazole.

5. A method as in claim 4 wherein said polymerizable heterocyclic compound is vinyl pyrrolidone or vinyl imidazole.

6. A method as in claim 1 wherein the polyolefin polymer added in said second step is added at a temperature of said oil solution between 120° C. and 170° C.

7. A method as in claim 1 wherein the polyolefin polymer added is different from the polyolefin polymer to which the methacrylic acid ester is grafted.

8. A method as in claim 1 wherein at least one of said polyolefin polymers, either that to which the methacrylic acid ester is grafted or that added to the oil solution, comprises at least 50 percent by weight of ethylene, the balance being propylene.

9. A polymer-in-oil solution prepared by the method of claim 1.

10. A method for making a polymer-in-oil solution, useful for improving the viscosity-temperature relationship and low-temperature properties of lubricating oils when added thereto, which method comprises polymerizing a methacrylic acid ester of an alcohol having 8 to 18 carbon atoms in a solution, in a lubricating oil, of a polyolefin polymer of an olefinic hydrocarbon monomer having two to four carbon atoms, the oil solution of said polyolefin having a viscosity of more than 15,000 centistokes at 100° C., whereby an oil solution of a first graft copolymer is formed, further graft copolymerizing, onto said first graft copolymer as a backbone, a polymerizable heterocyclic compound having a basic nitrogen atom in the ring thereof to form a second graft copolymer, separately graft copolymerizing such a polymerizable heterocyclic compound onto a polyolefin polymer, in a solution in a lubricating oil, of an olefinic hydrocarbon monomer having two to four carbon atoms to form a third graft copolymer, and then combining the oil solutions of said second graft copolymer and said third graft copolymer to form an oil solution comprising from 20 percent to 55 percent by weight of polymer, wherein said methacrylate ester comprises from 50 percent to 80 percent of the polymer content and the amount of polymerizable heterocyclic compound is from one to 30 percent by weight of said methacrylate ester.

11. A method as in claim 10 wherein said polyolefin polymer has an average molecular weight between 70,000 and 200,000.

12. A method as in claim 11 wherein said polyolefin polymer is prepared by the thermal or mechanical degradation of a polymer having a higher molecular weight.

13. A method as in claim 10 wherein said polymerizable heterocyclic compound is selected from the group consisting of vinyl pyridine, vinyl pyrrolidine, vinyl pyrrolidone, and vinyl imidazole.

14. A method as in claim 13 wherein said polymerizable heterocyclic compound is vinyl pyrrolidone or vinyl imidazole.

15. A method as in claim 10 wherein the polyolefin polymer employed to form said first graft copolymer and the polyolefin polymer employed to form said further graft copolymer are different.

16. A method as in claim 10 wherein at least one of said polyolefin polymers employed to form said first graft copolymer or said further graft copolymer comprises at least 50 percent by weight of ethylene, the balance being propylene.

17. A polymer-in-oil solution prepared by the method of claim 10.

* * * * *